United States Patent [19]
Rathore et al.

[11] Patent Number: 6,011,835
[45] Date of Patent: *Jan. 4, 2000

[54] METHOD AND APPARATUS FOR DETERMINING A CALLER'S ELIGIBILITY FOR A LOTTERY AND ADVISING LOTTERY WINNER DURING A SAME CALL

[75] Inventors: Ram N. S. Rathore, Randolph; Roy Philip Weber, Bridgewater, both of N.J.

[73] Assignee: AT&T Corp, New York, N.Y.

[ * ] Notice: This patent is subject to a terminal disclaimer.

[21] Appl. No.: 09/274,142

[22] Filed: Mar. 22, 1999

[51] Int. Cl.⁷ .................................................. H04M 11/00
[52] U.S. Cl. ............................ 379/93.13; 463/17; 463/41
[58] Field of Search ............................. 379/93.13, 93.12, 379/90.01, 110.01; 273/183.1; 463/17, 41

[56] References Cited

U.S. PATENT DOCUMENTS

| | | | |
|---|---|---|---|
| 4,792,968 | 12/1988 | Katz | 379/92 |
| 4,845,739 | 7/1989 | Katz | 379/92 |
| 4,996,705 | 2/1991 | Entenmann et al. | 379/91 |
| 5,073,929 | 12/1991 | Katz | 379/93 |
| 5,083,272 | 1/1992 | Walker et al. | 364/412 |
| 5,128,984 | 7/1992 | Katz | 379/92 |
| 5,251,252 | 10/1993 | Katz | 379/92 |
| 5,327,485 | 7/1994 | Leaden | 379/95 |
| 5,354,069 | 10/1994 | Guttman et al. | 273/439 |
| 5,403,999 | 4/1995 | Entenmann et al. | 235/379 |
| 5,608,785 | 3/1997 | Kasday | 379/93.13 |
| 5,713,795 | 2/1998 | Kohorn | 463/17 |
| 5,835,576 | 11/1998 | Katz | 379/93.13 |

*Primary Examiner*—Wing F. Chan

[57] ABSTRACT

A method and apparatus determine a caller's eligibility to enter a lottery, determine whether the caller has won the lottery and advises the caller of the winning status while communication services are provided between the caller and a called party. Thus, the caller can enter, win and be advised of winning status while communication, e.g. telephone voice communication, takes place between the caller and a called party. The caller need not dial a specific telephone number to enter the lottery. Instead, communication with any desired called party can take place.

13 Claims, 2 Drawing Sheets

METHOD AND APPARATUS FOR DETERMINING A CALLER'S ELIGIBILITY FOR A LOTTERY AND ADVISING LOTTERY WINNER DURING A SAME CALL

RELATED APPLICATIONS

This application is related to the following concurrently filed, commonly assigned applications: entitled "Method And Apparatus For Determining A Caller's Odds For Winning A Lottery Based On Caller History;" entitled "Method And Apparatus For Determining A Call-Based Lottery Winner's Prize Tier Based On Caller Participation History;" entitled "Method And Apparatus For Rewarding Groups Of Communication Service Users;" entitled "Lottery Method And Apparatus Having A Tiered Prize Scheme."

BACKGROUND OF THE INVENTION

1. Field of Invention

This invention relates to determining if a caller is eligible for a lottery and advising the caller if the caller is a winner of the lottery during a single call.

2. Description of Related Art

Traditional lottery systems, or other similar games of chance, require players to purchase lottery tickets or make some other similar directed action to enter a lottery. For example, U.S. Pat. No. 5,403,999 to Entenmann et al. describes a system that allows a player to enter a lottery by calling a specific telephone number and entering the lottery over the telephone. Thus, in the Entenmann system, the player can enter, win and be advised of winning the lottery during a single telephone call made to enter the lottery.

SUMMARY OF THE INVENTION

The invention provides a method and apparatus for determining a caller's eligibility to enter a lottery, determining if the caller is a winner of the lottery, and advising the caller of the winning status during a single call to a non-lottery oriented called party. Thus, according to the invention, a caller can enter, win and be advised of winning a lottery during a single call to any called party, not just one engaged in entering callers into a lottery.

A caller's eligibility to enter a lottery can be determined based on various criteria, such as the caller's calling profile, the time of day a call is made, a call destination, or dial-around code used to make a call. The call made by the caller can be a credit card call, a regular long-distance call or a dial-around code call, or can be any communications with a called party using any communications system, including wired and wireless communications networks, computer networks, the Internet, etc. If the caller or call meets the eligibility criteria, a determination is made whether the caller is a winner of the lottery while communications services are provided to the caller. If the caller is determined to be a winner, the caller is advised of the winning status and can also be informed of the prize won during the call. Entities other than the caller, but related to the call, can be winners of the lottery. For example, if a call is made from a particular household telephone, the caller placing the call can be advised of the household's winning status, e.g., by providing a message such as "the Smith family has just won a round trip ticket to San Francisco."

These and other aspects of the invention will be apparent or obvious from the following description.

BRIEF DESCRIPTION OF THE DRAWINGS

The invention is described in detail with regard to the following figures wherein like numerals reference like elements, and wherein.

DETAILED DESCRIPTION OF PREFERRED EMBODIMENTS

The invention is described below in connection with a telecommunication system. That is, as described below, callers make telephone calls to request communication services and communicate with a desired called party. However, it will be appreciated that the invention can be used with other types of communication systems, including wired and wireless communication systems, computer or other similar networks such as the Internet, etc. For example, the invention could be used as part of an Internet service provider (ISP) system such that each time a user accesses the Internet, a particular web site, a particular number or combination of web sites, or other similar computer network through the ISP's system, the user can be entered into and win a lottery. The user can access the Internet, computer network or other information source through a cable, satellite or other network or combination of networks. Likewise, communication service users that connect to a particular Internet web site, or view/interact with a particular television or other communication channel (either digital or analog), can be entered into and win a lottery. For example, users could be rewarded for viewing a particular television or other similar communication channel. Thus, the invention is not limited to use with telecommunication systems.

Likewise, the term caller refers to any person or entity, such as a group of individuals or a computer, facsimile machine or other device that requests and receives communications services. Thus, the term caller is not restricted to include only human callers in a telecommunications network.

The term called party is used in this description to refer to any person, entity, communication device or other communication destination other than an entity or system engaged in receiving requests for entry into a lottery, entering callers into a lottery and advising callers of their winning status (if appropriate). That is, the invention is not directed to dedicated lottery systems that receive communications, such as telephone calls, from callers to enter a lottery. Likewise, the term call is used to refer to any type of communications between a caller and a called party, not just telephone calls. Thus, a caller can "call" a called party over a telecommunications network, a computer network, the Internet, etc.

Figure 1:
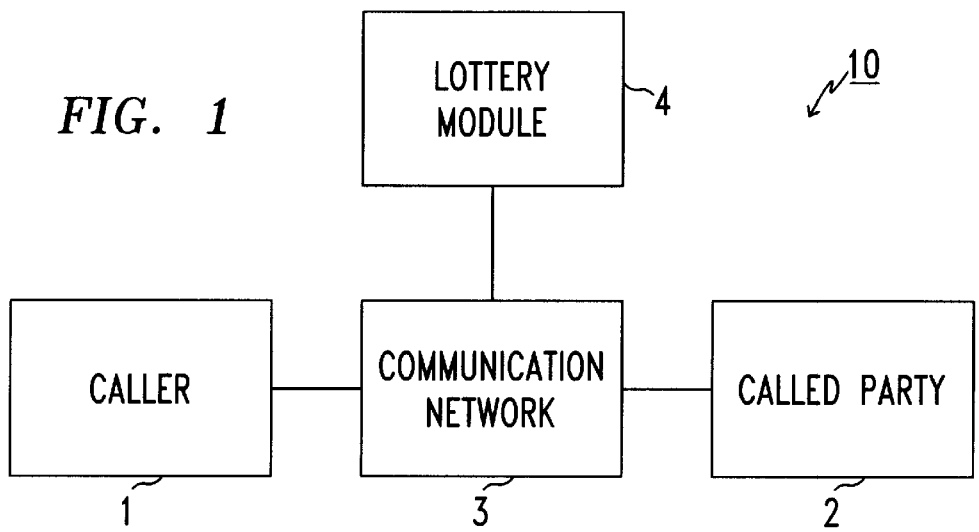
FIG. 1 is a schematic block diagram of a communications system including a lottery module in accordance with the invention.

FIG. 1 is a schematic block diagram of a communications system 10 configured in accordance with the invention. A caller 1 makes a request for communication services so that the caller 1 can at least receive communication information from a desired called party 2. The caller 1 and called party 2 can be a person or communication device, such as a facsimile machine, as desired. The caller 1 and/or called party 2 can use, or include, any number of different types of communications devices, including wired and wireless telephones, facsimile machines, modems, programmed general purpose computers, video conferencing devices, etc. In short, any communications device used for 1- or 2-way communication services can be used.

The caller 1's request for communication services can take different forms, depending upon the type of communication network 3 used to provide the communication services. For example, the request for communication services can include a dialed telephone number where the communication network 3 is a standard telecommunications network. However, the communication network 3 can include other communication systems, including wired and wireless communication systems, the Internet or other networks, etc. For convenience, the invention is described in connection with a telecommunications network. However, it should be understood that the invention can be used with other communication systems.

In this example, the caller 1 requests communication services by dialing a telephone number or other number sequence representing a desire to communicate with the called party 2. The communication network 3 receives the call request and provides communication services, e.g., sends communication information between the caller 1 and the called party 2, through a switched telecommunications network. Approximately simultaneously, a lottery module 4 associated with the communication network 3 determines if the caller or other entity associated with the provided communication services is eligible for entry into a lottery. In this example, a possible other entity associated with the communication services could be a person, group or business entity that maintains or is otherwise associated with a communication device used by the caller 1 to communicate with the called party 2. For example, the caller 1 who is actually using a communication device to make a telephone call may be borrowing another person's telephone to make a call. In this case, the lottery module 4 can determine that the person who owns the telephone or is responsible for paying for calls made using the telephone is eligible for entry into the lottery rather than the actual caller. In contrast, the lottery module 4 could determine whether the actual caller is eligible for entry into the lottery even when the caller 1 is not usually associated with the telephone being used to make a call. In this case, the caller 1 can enter an identification number, dial a specific access telephone number or follow some other procedure to identify the caller's identity to the lottery module 4 regardless of the telephone or other communication device being used to obtain communication services. However, for ease of reference, the term caller is used to refer to both the actual caller and/or any other entity associated with the call made.

While communication services are being provided to the caller, the lottery module 4 determines whether the caller 1 is a winner of the lottery. If the caller 1 is a winner, the caller 1 is advised of the winning status while communication services are being provided. For example, the lottery module 4 could interrupt the caller 1's call to advise the caller 1 of the winning status, call the caller 1 on another telephone line, display a video message on the caller 1's communication device or otherwise advise the caller 1 of the winning status. If the caller 1 is not a winner of the lottery, the lottery module 4 can either advise the caller 1 that the caller 1 did not win the lottery this time, or make no announcement at all to the caller 1. When the caller 1 or called party 2 wishes to terminate the communication services, e.g., by hanging up the telephone, the communication services are terminated.

Figure 2:
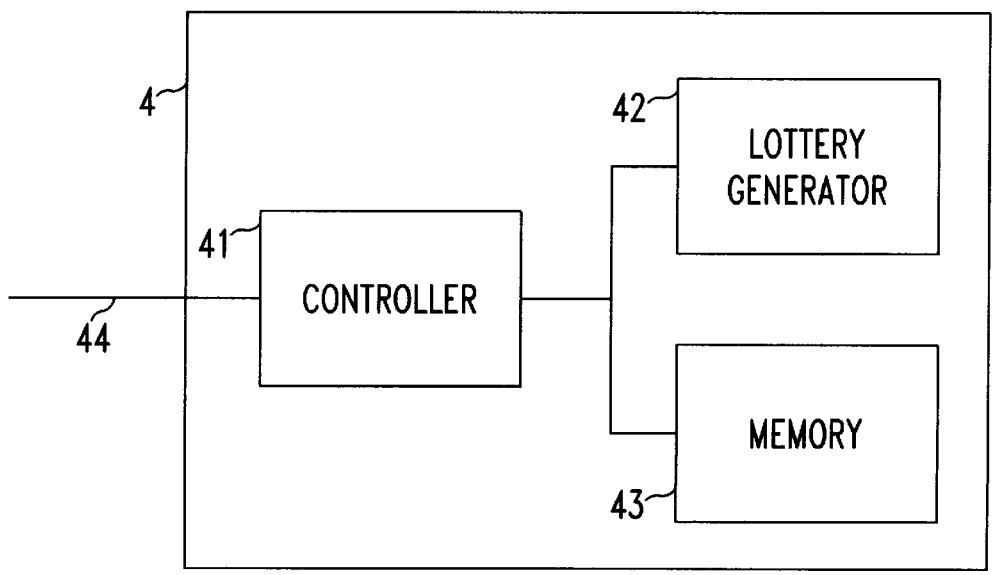
FIG. 2 is a schematic block diagram of a lottery module in accordance with the invention.

FIG. 2 is a schematic block diagram of one example of a lottery module. In this example, the lottery module 4 includes a controller 41 that receives and sends signals over a line 44, which communicates with the communication network 3. For example, the controller 41 can receive a signal over the line 44 from the communication network 3 indicating that a call request has been made and communication services are being provided to a caller 1. In response to the received signal, which can include information identifying the caller 1, the call's originating telephone number, the destination telephone number, other call destination information, etc., the controller 41 determines whether the caller 1 is eligible for entry into a lottery. Alternately, all callers 1 using the communication network 3 can be eligible for entry into a lottery for each call made. The eligibility determination can be based on various factors including information received from the communication network 3 and/or other information stored in a memory 43. The memory 43 can store information such as a caller 1's call profile, including a number of calls made by the caller 1 during a past period of time, a total amount of call time used by the caller 1, the types of calls made by the caller 1, etc. The controller 41 can also use information such as the time of day or day that a call is made, a specific dial-around code used to place a call, a call destination, or other information. In short, the controller 41 can use any desired information to make the eligibility determination.

Once the controller 41 determines that a caller 1 is eligible for entry into a lottery, the controller 41 sends a signal to a lottery generator 42 to enter the caller 1 into a lottery. The lottery generator 42 can enter the caller 1 into a standard lottery having defined odds and then provide an indication to the controller 41 whether the caller 1 has won the lottery. Alternately, the lottery generator 42 can adjust the odds of winning the lottery for the caller 1 based on the caller 1's past participation history, which can include any of the information discussed above used to make an eligibility determination. For example, the caller 1's odds of winning can be adjusted based on a number of calls placed by the caller 1 during a past time period, a total call time logged by the caller 1, the types of calls, e.g., credit card calls, dial-around calls, etc., a call destination such as a telephone number or geographical region, a time of day, a number of past entries into lotteries, a number of past lottery wins, etc. The odds of winning can be adjusted in any desired way, including providing the caller 1 with multiple entries into a lottery having predefined odds for winning, or providing the caller 1 with a single entry into a lottery that has adjusted odds.

If the caller 1 wins the lottery, the controller 41 sends a signal to the communication network 3 to notify the caller 1 of the caller 1's winning status while the call that prompted entry into the lottery is ongoing. The caller 1 can be notified of the winning status in various ways, including providing a voice message to the caller 1, displaying a message on the caller 1's communication device, telephoning the caller 1 on a separate telephone line, sending a facsimile or e-mail message to the caller 1, etc.

As one example, a caller 1 in New York can place a call to a called party 2 in California using a specific dial-around code. The caller 1 and called party 2 are connected to each other for communication and the lottery module 4 receives an indication that the call has been placed and communication services are being provided. The controller 41 determines whether the caller 1 is eligible for entry into a lottery based on desired criteria. For example, the fact that the caller 1 used the specific dial-around code could be enough to determine that the caller 1 is eligible for entry into a lottery. Alternately, other information, as discussed above, can be used for the eligibility determination. For example, the caller 1 could be determined eligible for entry into a lottery based on the fact that the caller 1 is calling California at 3 p.m. on a Thursday. Likewise, the caller 1 could be determined eligible because the caller 1 has made 20 or more calls to California during the past month, for example. Such eligibility determinations are not required, however, and each call indication received by the controller 41 could prompt entry into a lottery.

Once the caller 1 is determined to be eligible, the lottery generator 42 determines if the caller 1 has won the lottery. The caller 1 could be entered into a lottery having defined odds, e.g., one in ten thousand, or the caller 1's odds of winning could be adjusted as discussed above. For example, the caller 1 could have made more than a threshold number of calls using a specific dial-around code during the last month, and therefore be entitled to increased odds of winning the lottery. If the caller 1 wins the lottery, the caller 1 is advised of the winning status while communication services are being provided. The controller 41 can also direct the memory 43 to store information regarding the call, the caller 1's entry into the lottery, and the results of the lottery entry to build the caller 1's call profile.

The lottery module 4 can be implemented, at least in part, as a general purpose data processor and/or single special purpose integrated circuit (e.g., ASIC) or an array of ASICs each having a main or central processor section for overall, system-level control, and separate sections dedicated to performing various specific computations, functions and other processes under the control of the central processor section. The lottery module 4 can also be implemented using a plurality of separate dedicated programmable integrated or other electronic circuits or devices, e.g., hard wired electronic or logic circuits, such as discrete element circuits or programmable logic devices. The lottery module 4 also preferably includes other devices, such as volatile or non-volatile memory devices, communication devices, and/or other circuitry or components necessary to perform the desired input/output or other functions. For example, the lottery module 4 can include an interface, such as a user interface including a keyboard, monitor, user pointing device, etc., that allows an operator to input information into and receive information from the lottery module 4. The interface may also include other communications devices, including modems or other data communication devices, to allow the lottery module 4 to receive and send information.

Thus, according to at least one aspect of the invention, a caller can be entered into a lottery and advised whether the caller has won the lottery while communication services are being provided. Therefore, the caller need not wait until after terminating a call to find out whether the caller has won the lottery.

Further, the caller need not make a specific telephone call to enter a lottery. Instead, the caller can be entered into a lottery every time a normal telephone call is made and be advised whether he or she has won the lottery during the telephone call.

Figure 3:
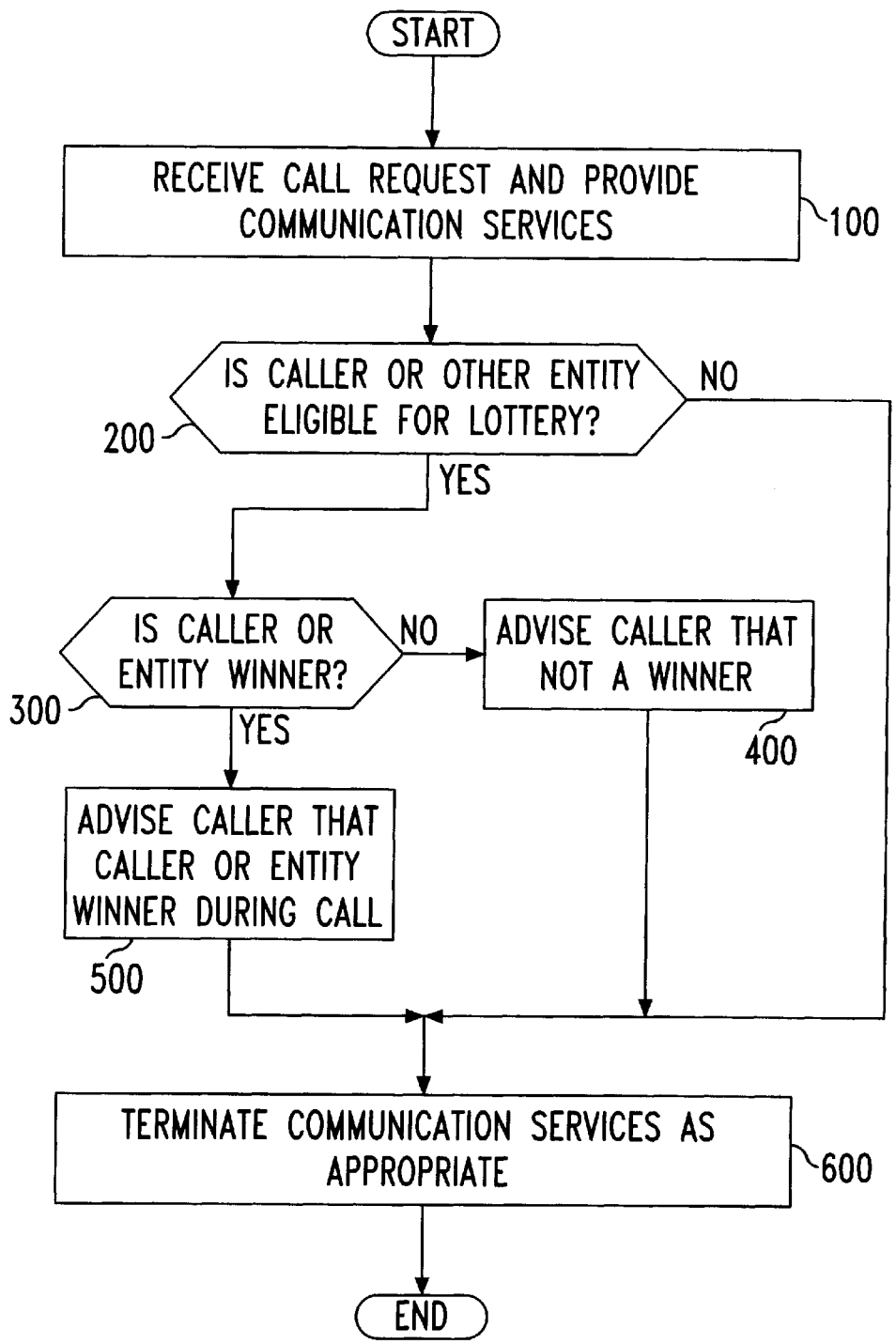
FIG. 3 is a flowchart of steps of a method for advising a caller of the caller's winning status during communication services in accordance with the invention.

FIG. 3 is a flowchart of steps for a method for determining a caller's eligibility for a lottery and advising the caller of winning status while providing a communication service to the caller, In step 100, a call request is received from a caller and communication services are provided to the caller. For example, a caller using a telephone could make a call request by dialing a telephone number or provide some other indication to a communication service provider that communication services are requested. In this example, the communication service provider, such as a telecommunications service provider, can receive the call request and provide the desired communication services. The communication services can include transmitting voice and/or data communications between the caller and another person or communication device. However, the called party is a person or entity that is not engaged in entering callers into a lottery in response to received telephone calls. As discussed above, the communication services can be provided using a wired or wireless telecommunications network, or other communication system.

While the communication services are being provided to the caller in response to the call request received in step 100, a determination is made in step 200 whether the caller is eligible for entry into a lottery. If the caller or other entity is not eligible for entry into a lottery, flow jumps to step 600 in which the communication services are terminated as appropriate. For example, the communication services could be terminated when the caller hangs up a telephone used to make the telephone call.

If the caller is eligible for entry into the lottery, a determination is made in step 300 whether the caller or other entity is a winner of the lottery. This determination can be made in any number of different ways, including using a random number generator to generate a number and then determining whether the randomly generated number matches or otherwise corresponds to a number associated with the caller. The number assigned to the caller can be a number that is assigned permanently, e.g., when the caller or other entity first obtains telephone service, or can be assigned to the caller immediately before a determination is made whether the caller is a winner of the lottery. However, the caller can be determined to be a winner of the lottery in other ways as desired.

The term lottery is used herein to refer to a game of chance or pseudo-game of chance such that the caller has a random, or pseudo-random, chance of winning. Thus, the lottery can be constructed to give the appearance of random winning when, in fact, the probability for a caller or other entity winning the lottery is adjusted based on various criteria, including a number of calls or total call minutes made or used by a caller during a recent past time period. For example, a caller's chances of winning the lottery could be artificially increased if the caller has made 100 previous telephone calls without winning the lottery. Other adjustments to the lottery can also be made as desired.

If the caller is determined to be a winner of the lottery, the caller is advised of the winning status while communication services are being provided in step 500. For example, a voice message that the caller has won the lottery could be presented to the caller during an ongoing telephone call. The caller can be advised of the winning status in other ways, including by viewing a message on a display associated with the caller's communication device, or by receiving a telephone call, e-mail transmission or other communication regarding the winning status. However the caller is advised of the winning status, the caller is advised while communication services that prompted the entry into the lottery are being conducted. Thus, the caller need not wait until after a call is completed to determine whether the lottery has been won.

If the caller is not the winner of the lottery, the caller is optionally advised in step 400 that the caller is not a winner, e.g., by a voice message presented to the caller. However, the caller need not be advised that the caller has not won the lottery, if desired. In step 600, the communication services are terminated as appropriate, e.g., when the caller hangs up the telephone.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A method for entering a caller into a lottery, comprising:
   receiving an indication that communication services are being provided to the caller so that the caller can at least receive communication information from a called party; and
   performing the following steps while providing the communication services to the caller:
   determining whether the caller is eligible for entry into a lottery;
   determining if the caller is a winner of the lottery, if the caller is eligible for entry into the lottery; and
   advising the caller that the caller has won the lottery if the caller is determined to have won the lottery.

2. The method of claim 1, wherein the step of receiving an indication that communication services are being provided comprises receiving a signal representing at least one of a telephone number and a dial-around number.

3. The method of claim 1, wherein the step of receiving an indication that communication services are being provided comprises connecting the caller to the called party through a communications network.

4. The method of claim 1, wherein the step of determining whether the caller is eligible for entry into a lottery comprises determining whether the caller, a telephone number associated with the caller, or other identification information is consistent with stored information.

5. The method of claim 1, wherein the step of advising the caller comprises at least one of providing the caller with a voice message, providing the caller with a visual message and providing the caller with a data transmission.

6. The method of claim 1, further comprising advising the caller that the caller is not a winner of the lottery while the communication services are being provided to the caller.

7. The method of claim 1, further comprising terminating the communication services after the caller is advised that the caller has won the lottery.

8. A communication system comprising:
   means for receiving an indication that communication services are being provided to the caller so that the caller can communicate with a called party;
   means for determining whether the caller is eligible for entry into a lottery;
   means for determining if the caller is a winner of the lottery, if the caller is eligible for entry into the lottery; and
   means for advising the caller that the caller has won the lottery while providing communication services to the caller if the caller is determined to have won the lottery.

9. A lottery module for use with a communication system, comprising:
   a memory that stores at least information related to caller's lottery authorization information;
   a lottery generator that determines whether an authorized caller has won a lottery; and
   a controller that receives a signal from the communication system that indicates communication services are being provided to a caller, that determines whether the caller is authorized for entry into a lottery based on information stored in the memory, and advises the caller that the caller has won a lottery while communication services are being provided to send communication information between the caller and a called party.

10. The lottery module of claim 9, wherein the controller receives a signal from the communication system representing at least one of a telephone number and a dial-around number.

11. The lottery module of claim 9, wherein the controller determines whether the caller is eligible for entry into a lottery by determining whether the caller, a telephone number associated with the caller, a dial-around code used to initiate the communication services or other identification information is consistent with stored information.

12. The lottery module of claim 9, wherein the controller advises the caller that the caller has won the lottery by at least one of providing the caller with a voice message, providing the caller with a visual message and providing the caller with a data transmission.

13. The lottery module of claim 9, wherein communication services are terminated after the caller is advised that the caller has won the lottery.

* * * * *